United States Patent Office 3,386,968
Patented June 4, 1968

3,386,968
TETRAZOLE POLYMERS
Wayne R. Carpenter, Ridgecrest, Calif., assignor to the United States of America as represented by the Secretary of the Navy
No Drawing. Filed Nov. 15, 1962, Ser. No. 238,057
9 Claims. (Cl. 260—78.4)

The invention described herein may be manufactured and used by or for the Government of the United States of America for governmental purposes without the payment of any royalties thereon or therefor.

The present invention relates to new tetrazole polymers, and more particularly to tetrazole polymers derived from the condensation reaction of organic diazides with electronegative dinitriles.

The instant type polymers have not been previously synthesized. The recent discovery by applicant of the reaction between electronegative nitriles and organic azides to produce 1,5-disubstituted tetrazoles, disclosed in copending patent application Ser. No. 230,772, filed Oct. 15, 1962, now U.S. Patent No. 3,138,609, led to this invention which comprises a new series of tetrazole polymers formed by the condensation of dinitriles with diazides.

An object of the present invention is the provision of new tetrazole polymers for use in high density, thermally stable propellant binders.

Another object is to provide a wide variety of tetrazole polymers having different physical and chemical properties which may find use as additives to thermally stable plastics.

Other objects and features of the invention will become apparent to those skilled in the art as the disclosure is made in the following description.

The general method of preparation of the compositions of this invention comprises heating a 1:1 mole mixture of diazide, or mixtures of diazides, with an electronegatively substituted dinitrile at about 150° C. for from 20 to 24 hours.

In the condensation reaction either aromatic or aliphatic azides have been used, but only the primary aliphatic azides have sufficient thermal stability to withstand the reaction temperature of 150° without partial decomposition. The system for polymer formation used herein may be generally characterized as follows using perfluorodinitriles and alkylene diazides:

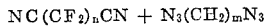

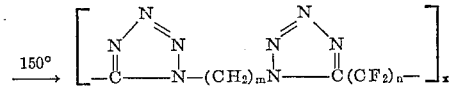

Wherein $m$ is one of the numerals 5 to 10 and $n$ is one of the numerals 3 to 8. Since very little thermal degradation of the nitrile and azide takes place at 150° C., the yield of polymer is essentially quantitative. The molecular weight is, therefore, a function of the purity of the starting materials, nearness of the ratio of reactants to the ideal stoichiometry, and the extent of condensation. The last factor is governed by the time and temperature of reaction. Although the reaction will proceed faster at a higher temperature, the azide will also begin to decompose.

The following examples illustrate the invention but are not to be considered as limiting it.

Example I 7.36 grams of perfluoroglutaronitrile and 9.36 grams of hexamethylene diazide were sealed in a glass vial which was then heated in a reaction bomb at 150° C. for 20 hours. The vial was cooled in liquid nitrogen to shrink the polymer away from the glass before being opened to remove the clear, flexible polymer which has a molecular weight of about 3500 and a melting point of 100–150° C. The reaction may be represented generally as follows wherein $x$ represents an average value of about 9.5.

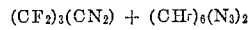

Analytical data obtained on the purified polymer gave the following results:
Calculated: C=35.68; H=3.27; N=30.26; F=30.79.
Found: C=35.37; H=2.90; N=30.36; F=29.94.

Example II

Perfluoroadiponitrile and hexamethylene were heated together as described in Example I and an opaque, brittle polymer formed which has a molecular weight of 15,000 and a melting point of 130–140° C. The reaction may be represented generally by the following equation:

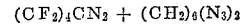

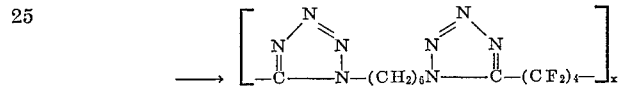

Analytical data obtained on the purified polymer gave the following results:
Calculated: C=34.29; H=2.88; N=26.66; F=36.16.
Found: C=34.50; H=2.80; N=27.35; F=35.26.

Example III

Perfluorosuberonitrile and hexamethylene diazide were heated together under the condition described in Example I and an opaque, brittle polymer formed with a melting point of 140–200° C. The reaction may be generally characterized by the following equation:

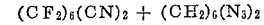

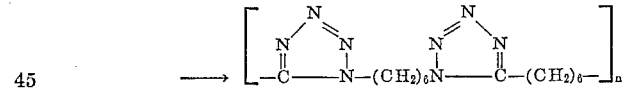

Analytical data obtained on the purified product gave the following results:
Calculated: C=32.32; H=2.33; N=21.54; F=43.84.
Found: C=32.60; H=0.53; N=21.71; F=45.28.

Example IV

Perfluorosuberonitrile and decamethylene diazide were heated together under conditions similar to Example I and an opaque, brittle polymer resulted with a melting point of 106–108° C. The reaction may be represented by the following equation:

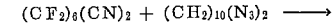

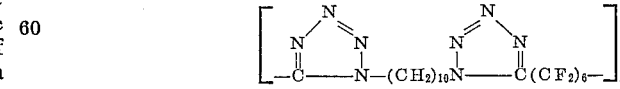

Analytical data on the purified polymer gave the following results: Calculated: C=37.51; H=3.50; N=19.44; F=39.56. Found: C=37.31; H=3.14; N=18.84; F=41.05.

Example V

Perfluorosebaconitrile and hexamethylene diazide were heated together according to the method hereinbefore described and an opaque brittle polymer resulted with a melting point of 160–170° C. The reaction may be written as follows:

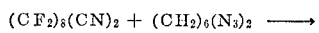

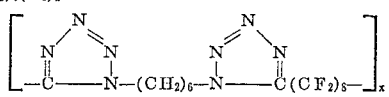

Analytical data on the purified polymer gave the following results:
Calculated: C=30.98; H=1.95; N=18.06; F=49.00.
Found: C=30.32; H=2.36; N=18.74; F=49.11.

Example VI

Perfluoroadiponitrile and 3,3-bis(azidomethyl)oxetane were heated together as hereinbefore described and a white intractable solid resulted with a melting point of 255–300° C. This reaction may be characterized as follows:

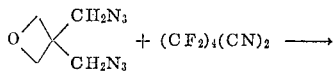

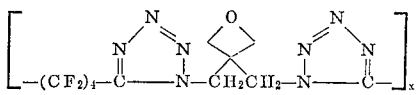

Analytical data for the polymer gave the following:
Calculated: C=31.44; H=1.92; N=26.67; F=36.17.
Found: C=31.67; H=2.30; N=26.43; F=36.38.

Example VII

Perfluoroadiponitrile and a mixture of diazides (comprising approximately 55.13% by weight pentamethylene diazide, 24.79% by weight hexamethylene diazide and 20.08% by weight decamethylene diazide) having the same percentage of azide groups as hexamethylene diazide, were heated together as describd in Example I. An elastomeric, cold-flowing, non-crystalline polymer was formed. Analytical data obtained confirm the chemical composition of this polymer as follows:
Calculated: C=34.29; H=2.88; N=26.66; F=36.16.
Found: C=34.63; H=2.85; N=26.37; F=36.22.

Example VIII

Perfluorosuberonitrile and a mixture of diazides (used in Example VII) comprising approximately 55.13% by weight pentamethylene diazide, 24.79% by weight hexamethylene diazide and 20.08% by weight decamethylene diazide were heated together in a sealed container at about 150° C. for 20 hours and a clear, flexible polymer formed with a melting point of 150–200° C. Analytical data on this polymer is as follows:
Calculated: C=32.32; H=2.33; N=21.54; F=43.84.
Found: C=32.06; H=2.34; N=21.08; F=44.13.

Example IX

Perfluorosebaconitrile and a mixture of diazides comprising pentamethylene diazide (55.13%), hexamethylene diazide (24.79%) and decamethylene diazide (20.08%) were mixed and heated together according to the procedure described in Example VIII. A clear, flexible polymer formed with a melting point of 130–190° C. Analytical data on this polymer is as follows:
Calculated: C=30.98; H=1.95; N=18.06; F=49.00.
Found: C=30.31; H=2.44; N=17.24; F=49.89.

Example X

Perfluoroglutaronitrile and a mixture of diazides comprising pentamethylene diazide (55.13%), hexamethylene diazide (24.79%) and decamethylene diazide (20.08%) were mixed and heated together according to the procedure described above. A clear, elastomeric, cold-flowing product formed.

Example XI

Dicyanofuroxane and hexamethylene diazide were heated together according to the procedure of Example I and a clear, brown, brittle solid resulted with a melting point of 110–150° C. This reaction may be represented as follows:

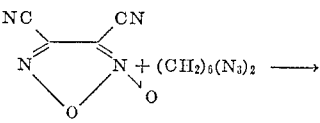

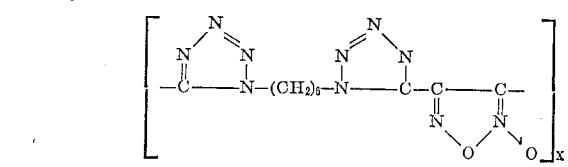

A wide range in solubility properties was observed among the various types of polymers. The polymers produced in Examples I–X are soluble without decomposition in concentrated acids such as trifluoroacetic acid, 100% nitric acid and 98% sulfuric acid. The polymer formed in Example XI is also soluble in concentrated acids but is decomposed by them. The tetrazole ring, though very weakly basic in these polymers is undoubtedly the cause of the polymers' solubility in strong acids. In cold organic solvents such as acetone, acetonitrile, methylene chloride and dimethylformamide, polymers formed in Examples I and XI are quite soluble. The polymer formed in Example II is soluble in these solvents when hot. Polymers formed in Examples III, IV, V, and VI, are insoluble in hot acetone, acetonitrile and methylene chloride. Polymers VIII and IX are soluble in acetone but not in acetonitrile or methylene chloride. Hot dimethylformamide will dissolve the polymers of Examples IV, VIII and IX, whereas the polymer of Example III is only swelled by it and the polymer of Example V does not appear to be affected. Thus, a generalization can be made that the higher the fluorine content the less soluble the polymer. Also, those polymers made from a mixture of diazides are more soluble than those made from a single diazide.

The polymers were purified on the basis of their solubility characteristics. The polymer of Example I was purified by reprecipitation from methylene chloride solution by dilution with hexane. With the purified polymer, a molecular weight of 3500 was estimated from its intrinsic viscosity of 0.180 dl/g. in ethylene dichloride at 30° C. The polymer of Example II was conveniently purified by cooling the hot acetonitrile solution and drying the powdery precipitate. From this material a molecular weight of about 15,000 was estimated from its intrinsic viscosity of 0.286 dl/g. at 30° C. in perfluorobutyric acid solution. An attempt was also made to determine its molecular weight ebullioscopically in refluxing trifluoroacetic acid, but low, inconsistent values ranging from 700 to 1500 were obtained, probably as a result of partial protonation of the tetrazole groups by trifluoroacetic acid.

An interesting feature of the polymers formed in Examples II, III and V is their ability to form melt-drawn fibers. The fibers thus formed are quite flexible and can be further stretched. The stretching apparently arranges the polymer chains into a crystalline orientation, as evidenced by X-ray spectrograms on the unstretched and stretched fibers. Furthermore, the polymers from which the fibers were drawn are crystalline. However, the polymer of Example I, which differs from the polymer of Example II only by one $CF_2$ group, is non-crystalline. The polymers which were made from a mixture of diazides (Examples VII–X) were non-crystalline, more flexible and exhibited less tendency to form melt-drawn fibers. As has been observed in other polymeric systems, apparently the crystallinity is associated with chain regularity, and when this regularity is broken up by using a mixture of diazides, the crystallinity is destroyed.

The polymer formed in Example XI is interesting in that it was formed from a non-fluorinated dinitrile. In this case the cyano groups of dicyanofuroxane are activated by the electron-withdrawing effect of the furoxane ring. This polymer has a high nitrogen content and a heat of formation of +162 Kcal./mole and heat of combustion of −1512 Kcal./mole. However, it has poor physical properties.

A study was made of the thermal degradation of some of the polymers prepared herein. Differential thermal analysis of the polymer prepared in Example II (hexamethylene diazide and perfluoroadiponitrile) showed that this polymer begins exothermic decomposition with concurrent gas evolution at about 250° C. The gas and heat evolution are at a maximum at 325° C. The decomposition here evidenced parallels closely the decomposition of 1-octyl-5-perfluoropropyltetrazole, which starts exothermic decomposition and gas evolution at 270° C. with peak decomposition at 330° C. The concurrent gas evolution suggests that the tetrazole ring is being degraded first. A more careful study was made on the polymer produced as described in Example III (hexamethylene diazide-perfluorosuberonitrile). A sample was heated for 3½ hours at 237±4° C. at 0.025 mm. Hg. A liquid nitrogen trap was provided to condense any volatiles not consisting of nitrogen. Under these conditions 6.5 mole percent of nitrogen was lost per tetrazole group. The residue was darkened but still tough and somewhat flexible; it was no longer soluble in trifluoroacetic acid, but did swell in it. Heating was continued on the partially pyrolyzed residue, this time at 255°±5° C. for 4½ hours. Since no material condensed in the liquid nitrogen trap it is assumed therefore that all of the weight loss was due to nitrogen evolution. On this assumption 59.4 mole percent of nitrogen was lost per tetrazole group in the second heating, making a total of 65.9%. The residue was black but not inflexible. An infrared spectrum on the residue suggests that NH and C=N groups are being formed. A general theory of initial pyrolysis is proposed below based on the evidence obtained.

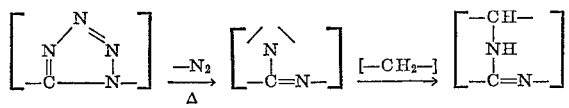

Obviously many modifications and variations of the present invention are possible in the light of the above teachings. It is therefore to be understood that within the scope of the appended claims the invention may be practiced otherwise than as specifically described.

What is claimed is:
1. The polymer formed from the reaction of perfluorosuberonitrile and a mixture of diazides consisting essentially of pentamethylene diazide, hexamethylene diazide and decamethylene diazide at a temperature of about 150° C. for 20 hours.
2. Polymers of the general formula

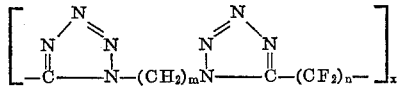

wherein $m$ is one of the numbers 5 to 10 and $n$ is one of the numbers 3 to 8 and $x$ represents an average value greater than 9.5.

3. A polymer of the formula

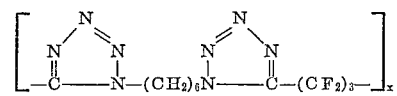

wherein $x$ represents an average value greater than 9.5.

4. A polymer of the formula

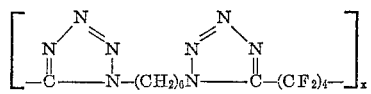

wherein $x$ represents an average value greater than 9.5.

5. A polymer of the formula

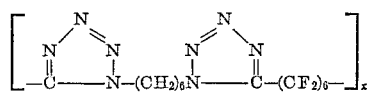

wherein $x$ represents an average value greater than 9.5.

6. A polymer of the formula

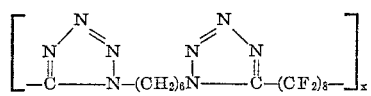

wherein $x$ represents an average value greater than 9.5.

7. A polymer of the formula

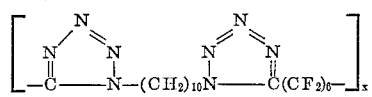

wherein $x$ represents an average value greater than 9.5.

8. A polymer of the formula

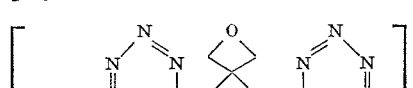

wherein $x$ represents an average value greater than 9.5.

9. A polymer of the formula

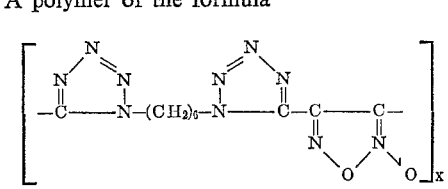

wherein $x$ represents an average value greater than 9.5.

No references cited.

SAMUEL H. BLECH, *Primary Examiner.*

CARL D. QUARFORTH, *Examiner.*

J. W. WHISLER, *Assistant Examiner.*